US012738962B2

(12) United States Patent
Yang et al.

(10) Patent No.: US 12,738,962 B2
(45) Date of Patent: Sep. 15, 2026

(54) DIGITAL DOMAIN SELF-INTERFERENCE CANCELLATION METHOD AND APPARATUS, DEVICE, AND STORAGE MEDIUM

(71) Applicant: ZTE CORPORATION, Shenzhen (CN)

(72) Inventors: Bojing Yang, Shenzhen (CN); Jian Li, Shenzhen (CN); Yaojuan Liang, Shenzhen (CN); Xiao Ma, Shenzhen (CN); Bin Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 68 days.

(21) Appl. No.: 18/730,379

(22) PCT Filed: Jan. 5, 2023

(86) PCT No.: PCT/CN2023/070716
§ 371 (c)(1),
(2) Date: Jul. 19, 2024

(87) PCT Pub. No.: WO2024/001148
PCT Pub. Date: Jan. 4, 2024

(65) Prior Publication Data

US 2025/0112656 A1 Apr. 3, 2025

(30) Foreign Application Priority Data

Jun. 30, 2022 (CN) ......................... 202210762907.6

(51) Int. Cl.
*H04B 1/12* (2006.01)
*H04L 25/02* (2006.01)
*H04L 25/03* (2006.01)

(52) U.S. Cl.
CPC ........... *H04B 1/12* (2013.01); *H04L 25/0204* (2013.01); *H04L 25/03866* (2013.01)

(58) Field of Classification Search
CPC .......... H04B 1/12; H04B 1/123; H04B 1/525; H04L 25/0204; H04L 25/03866; H04L 25/0224
See application file for complete search history.

(56) References Cited

U.S. PATENT DOCUMENTS

2016/0183100 A1* 6/2016 Xue ....................... H04B 1/525 370/252
2019/0052304 A1* 2/2019 Wang .................... H04B 1/525
(Continued)

FOREIGN PATENT DOCUMENTS

CN 106209151 A 12/2016
CN 108111186 A 6/2018
(Continued)

OTHER PUBLICATIONS (ISA/237) Written Opinion of the International Searching Authority dated Jun. 7, 2023.
(Continued)

*Primary Examiner* — Syed Haider
(74) *Attorney, Agent, or Firm* — NZ Carr Law Office

(57) ABSTRACT

Embodiments of the present disclosure relate to the technical field of network communications, and provide a digital domain self-interference cancellation method, a device, and a storage medium. The method comprises: generating a scrambling signal on the basis of a first information source inputted by a baseband unit by a fronthaul interface, and sending the scrambling signal to at least one remote radio unit; receiving a second information source sent by the remote radio unit on the basis of the scrambling signal, and performing a correction operation on a preset reference cancellation signal on the basis of the second information
(Continued)

S101
Receive, on the basis of a fronthaul interface, a first information source inputted by a baseband unit, generate a scrambling signal on the basis of the first information source, and send the scrambling signal to at least one remote radio unit S102
Receive a second information source sent by the remote radio unit on the basis of the scrambling signal, and perform a correction operation on a preset reference cancellation signal on the basis of the second information source to obtain a target cancellation signal S103
Perform self-interference cancellation processing on the second information source on the basis of the target cancellation signal to obtain a target information source source to obtain a target cancellation signal; and performing self-interference cancellation processing on the second information source on the basis of the target cancellation signal to obtain a target information source.

14 Claims, 4 Drawing Sheets

(56) References Cited

U.S. PATENT DOCUMENTS

| | | | | |
|---|---|---|---|---|
| 2019/0116568 | A1* | 4/2019 | Fertonani | H04W 56/00 |
| 2020/0259554 | A1 | 8/2020 | Kim et al. | |
| 2021/0126669 | A1* | 4/2021 | Roberts | H04B 1/525 |

FOREIGN PATENT DOCUMENTS

| | | | |
|---|---|---|---|
| CN | 110611521 | A | 12/2019 |
| CN | 113038591 | A | 6/2021 |

OTHER PUBLICATIONS

The international search report of the corresponding PCT Application No. PCT/CN2023/070716 mailed on Jun. 7, 2023 along with English translation thereof.

* cited by examiner

300
Digital domain self-interference cancellation device
301
Processor
303
302
Memory

DIGITAL DOMAIN SELF-INTERFERENCE CANCELLATION METHOD AND APPARATUS, DEVICE, AND STORAGE MEDIUM

CROSS-REFERENCE TO RELATED APPLICATIONS

The present disclosure is based on the international application No. PCT/CN2023/070716, filed on Jan. 5, 2023, which claims priority to Chinese patent application CN202210762907.6, filed on Jun. 30, 2022, and entitled "DIGITAL DOMAIN SELF-INTERFERENCE CANCELLATION METHOD AND APPARATUS, DEVICE, AND STORAGE MEDIUM," the entire contents of which are incorporated into the present disclosure by reference.

TECHNICAL FIELD OF THE INVENTION

The present disclosure relates to the technical field of network communications, and in particular, to a digital domain self-interference cancellation method and apparatus, a device, and a storage medium.

BACKGROUND OF THE INVENTION

In order to alleviate the condition of increasing scarcity of radio spectrum resources with an exponential increase in wireless devices, a Co-time Co-frequency Full Duplex (CCFD) technique is typically employed in the communication field to increase the utilization of radio spectrum resources. Compared with the traditional Half Duplex (HD) mode (such as frequency division duplex mode and time division duplex mode), the CCFD mode nearly doubles the spectrum utilization. A CCFD system is generally composed of a receiver and a transmitter. Since a receiving antenna of the receiver is relatively close to a transmitting antenna of the transmitter, the receiving antenna would receive a signal sent by the transmitting antenna, forming a self-interference phenomenon, and resulting in that the signal sent by the transmitting antenna severely affects the normal reception of the receiving antenna. Therefore, in order to ensure the normal transmission of the signal, it is necessary to deploy a self-interference cancellation apparatus to cancel the self-interference signal.

Current digital domain self-interference cancellation methods for the CCFD system typically perform self-interference cancellation on a single remote radio unit in the CCFD system, but cannot cancel the self-interference signals of multiple remote radio units at the same time, which makes the distributed deployment cost of the CCFD system containing multiple remote radio units high.

SUMMARY OF THE INVENTION

Embodiments of the present disclosure provide a digital domain self-interference cancellation method and apparatus, a device, and a storage medium, which aim to solve the technical problem that the distributed deployment cost of the CCFD system is high at present.

An embodiment of the present disclosure provides a digital domain self-interference cancellation method, including:

receiving, on the basis of a fronthaul interface, a first information source inputted by a baseband unit, generating, on the basis of the first information source, a scrambling signal, and sending the scrambling signal to at least one remote radio unit;

receiving a second information source sent by the remote radio unit on the basis of the scrambling signal, and performing, on the basis of the second information source, a correction operation on a preset reference cancellation signal to obtain a target cancellation signal; and performing, on the basis of the target cancellation signal, self-interference cancellation processing on the second information source to obtain a target information source.

An embodiment of the present disclosure further provides a digital domain self-interference cancellation apparatus, including:

a self-interference scrambling module, configured to receive a first information source inputted by a baseband unit on the basis of a fronthaul interface, generate a scrambling signal on the basis of the first information source, and send the scrambling signal to at least one remote radio unit;

a self-interference channel estimation module, configured to receive a second information source sent by the remote radio unit on the basis of the scrambling signal, and perform an estimation operation on the second information source and a calculation result of an adaptive algorithm module;

a self-interference signal cancellation module, configured to perform self-interference cancellation processing on the second information source on the basis of a target cancellation signal to obtain a target information source; and the adaptive algorithm module, configured to perform a correction operation on a preset reference cancellation signal on the basis of the second information source to obtain a target cancellation signal.

An embodiment of the present disclosure further provides a digital domain self-interference cancellation device. The digital domain self-interference cancellation device includes a processor, a memory, a computer program stored on the memory and executable by the processor, and a data bus for realizing connection communication between the processor and the memory, wherein the computer program, when executed by the processor, implements any one of the digital domain self-interference cancellation methods as provided in the description of the present disclosure.

An embodiment of the present disclosure further provides a non-transitory storage medium for computer-readable storage, the storage medium storing one or more programs executable by one or more processors to implement any one of the digital domain self-interference cancellation methods as provided in the description of the present disclosure.

BRIEF DESCRIPTION OF DRAWINGS

In order to illustrate the technical solutions of the embodiments of the disclosure more clearly, the accompanying drawings required to be used in the description of the embodiments will be briefly introduced below. It is obvious that the accompanying drawings in the following description are some embodiments of the present disclosure, and other drawings can be obtained by a person having ordinary skill in the art according to these drawings without paying inventive step.

DETAILED DESCRIPTION OF THE INVENTION

The technical solutions in the embodiments of the present disclosure will be clearly and completely described below in conjunction with the accompanying drawings in the embodiments of the present disclosure. It is obvious that the described embodiments are part of the embodiments of the present disclosure, rather than all of the embodiments. Based on the embodiments in the present disclosure, all other embodiments obtained by a person having ordinary skill in the art without making inventive labor, belong to the scope of protection of the present disclosure.

The flowcharts shown in the figures are only illustrative and do not necessarily include all of the content and operations/steps nor are they necessarily performed in the order described. For example, some of the operations/steps may also be broken down, combined or partially combined so that the order of actual execution may vary depending on circumstances.

It should be understood that the terminology used in the description of the present disclosure herein is for the purpose of describing specific embodiments only and is not intended to limit the present disclosure. As used in the description of the present disclosure and the appended claims, the singular forms "a," "an," and "the" are intended to include the plural forms as well, unless the context clearly indicates otherwise.

Embodiments of the present disclosure provide a digital domain self-interference cancellation method and device, and a storage medium. The digital domain self-interference cancellation method can be applied to mobile terminals, which may be electronic devices such as cell phones, tablet computers, notebook computers, desktop computers, personal digital assistants (PDAs) and wearable devices.

Some embodiments of the present disclosure will be described below in detail with reference to the accompanying drawings. In case of no conflict, the following embodiments and features of the embodiments may be combined with each other.

Hereinafter, the digital domain self-interference cancellation method provided by the embodiments of the present disclosure will be described in detail in connection with the scenario in FIG. 1. It needs to be understood that the scenario in FIG. 1 is only used to explain the digital domain self-interference cancellation method provided by the embodiments of the present disclosure, but does not constitute a limitation to the application scenario of the digital domain self-interference cancellation method provided by the embodiments of the present disclosure.

Figure 1:
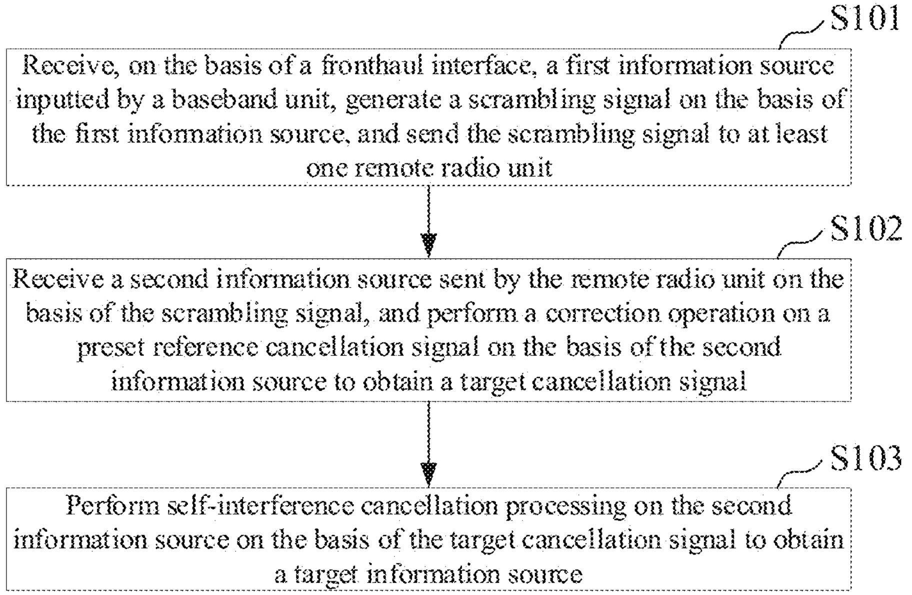
FIG. 1 is a flowchart of a first embodiment of a digital domain self-interference cancellation method according to the present disclosure.

Referring to FIG. 1, which is a flowchart of a first embodiment of a digital domain self-interference cancellation method according to the present disclosure.

As shown in FIG. 1, the digital domain self-interference cancellation method includes steps S101 to S103.

At step S101, a first information source inputted by a baseband unit is received on the basis of a fronthaul interface, a scrambling signal is generated on the basis of the first information source, and the scrambling signal is sent to at least one remote radio unit.

In this embodiment, the digital domain self-interference cancellation method is applied to a digital domain self-interference cancellation apparatus and a CCFD system. The digital domain self-interference cancellation apparatus is deployed at the fronthaul interface between the baseband unit and the remote radio unit in the CCFD system, and is deployed separately from the baseband unit and the remote radio unit. Meanwhile, the digital domain self-interference cancellation apparatus provided by the embodiment of the present disclosure has advantages of fast independent deployment due to having no special interface requirements for existing 5G network units and no extra overhead requirements for hardware resources and computational resources.

In an exemplary embodiment, the digital domain self-interference cancellation apparatus is deployed at the fronthaul interface between the baseband unit (BBU) of the current 5G network and a plurality of remote radio units (RRUs), and downlink traffic signals are transmitted to the digital domain self-interference cancellation apparatus via the existing fronthaul interface. The digital domain self-interference cancellation apparatus generates a scrambling sequence according to a service type of the first information source, combines the first information source to generate a scrambling signal, and transmits the scrambling signal to the plurality of RRUs by means of the existing fronthaul interface.

In an exemplary embodiment, the digital domain self-interference cancellation apparatus may include a self-interference scrambling module, a self-interference channel estimation module, a self-interference signal cancellation module, and an adaptive algorithm module.

In an exemplary embodiment, the baseband unit inputs the first information source to the self-interference scrambling module of the apparatus by means of a downlink fronthaul interface. The self-interference scrambling module can perform discrimination according to the service form (including but not limited to signal energy, signal quality, the coding mode, the service mode, etc.) of the first information source inputted by the baseband unit, generate a self-interference scrambling reference signal, combine the self-interference scrambling reference signal with the first information source to generate a scrambling signal, and transmit the scrambling signal to at least one radio remote unit connected to the digital domain interference cancellation apparatus by the baseband unit.

The first information source is a set of service downlink fronthaul signals inputted by the baseband unit; and the self-interference scrambling reference signal may be a linear or non-linear component information source.

In an exemplary embodiment, generating the scrambling signal on the basis of the first information source includes:

- generating a scrambling reference signal based on the service form of the first information source; wherein the service form includes signal energy, signal quality, the coding mode and the service mode; and
- performing scrambling processing on the first information source on the basis of the scrambling reference signal to generate the scrambling signal.

In this embodiment, a linear self-interference cancellation component information source and a nonlinear self-interference cancellation component information source are generated by the self-interference signal generation module according to a service model. The scrambling signal can be generated by combining the component information sources with the first information source. Generating the scrambling signal based on the service forms of the first information source can restore the authenticity and continuity of the signal to the greatest extent.

At step S102, a second information source sent by the remote radio unit on the basis of the scrambling signal is received, and a correction operation is performed on a preset reference cancellation signal on the basis of the second information source to obtain a target cancellation signal.

In this embodiment, after receiving the scrambling signal, the remote radio unit spatially propagates the scrambling signal, and inputs a near-end reception signal after spatial propagation as a second information source into a self-interference signal estimation module in the digital domain self-interference cancellation apparatus for adaptive algorithm estimation. The adaptive algorithm module performs iterative optimization on the preset reference cancellation signal according to the estimation result, then makes a judgment according to the decision-making function, and determines the target cancellation signal.

In an exemplary embodiment, the self-interference channel estimation module can perform channel estimation on the second information source (an uplink fronthaul signal with a self-interference scrambling sequence) and the calculation result of the adaptive algorithm module by taking the preset reference cancellation signal generated by the self-interference scrambling module as a preset reference cancellation signal vector.

In an exemplary embodiment, the adaptive algorithm module can perform an algorithm operation based on the estimation result of the self-interference channel estimation module, the preset reference cancellation signal and the second information source, and perform a correction operation on the preset reference cancellation signal, thereby calculating an adaptive cancellation signal suitable for canceling the scrambling sequence of the second information source. The adaptive algorithm module may include a deep learning model based on backpropagation algorithm, a BP neural network model based on feedforward, a decision-making model based on game theory, and etc.

In an exemplary embodiment, receiving the second information source sent by the remote radio unit on the basis of the scrambling signal includes:

propagating the scrambling signal spatially by the remote radio unit, and acquiring a near-end reception signal of the remote radio unit as the second information source; and receiving the second information source sent by each remote radio unit on the basis of at least one fronthaul interface.

In an exemplary embodiment, after the scrambling signal is transmitted to each radio remote unit (RRU) by means of the fronthaul interface, each RRU transmits and receives and spatially propagates the scrambling signal according to its actual use or system configuration antenna bitmap. The near-end transmission signal and reception signal of the RRU after spatial propagation can be obtained through the CCFD system. The near-end reception signal is transmitted, as the second information source, to the self-interference signal estimation module in the digital domain self-interference cancellation apparatus by means of the fronthaul interface for adaptive algorithm estimation.

In an exemplary embodiment, the digital domain self-interference cancellation method provided by the present disclosure can be applied to 5G CCFD (Co-time Co-frequency Full Duplexing) systems and similar wireless communication network systems, and are independently deployed at the fronthaul interface between the baseband unit and the remote radio unit, and similar related interfaces. In addition, the digital domain self-interference cancellation method provided by the present disclosure can also be applied to multi-antenna joint interference cancellation scenarios under multi-baseband unit and multi-radio remote unit networking, or multi-antenna joint interference cancellation scenarios under distributed system networks.

At step S103, self-interference cancellation processing is performed on the second information source on the basis of the target cancellation signal to obtain a target information source.

In this embodiment, after estimation and iterative optimization is performing on the preset reference cancellation signal via the adaptive algorithm, the target cancellation signal is determined according to the judgement results of the decision-making function, related cancellation processing is performed on the second information source by the self-interference signal cancellation module, and finally the target information source is obtained after self-interference cancellation, and the target information source is transmitted to the baseband unit by means of the uplink fronthaul interface.

In an exemplary embodiment, the self-interference cancellation module can perform self-interference cancellation processing on the second information source based on the self-interference cancellation signal, so as to obtain a target information source (the uplink service signal after self-interference optimization), and transmit the target information source to the baseband unit by means of the uplink fronthaul interface.

This embodiment provides the digital domain self-interference cancellation method, which includes: receiving a first information source inputted by a baseband unit on the basis of a fronthaul interface, generating a scrambling signal on the basis of the first information source, and sending the scrambling signal to at least one remote radio unit; receiving a second information source sent by the remote radio unit on the basis of the scrambling signal, and performing a correction operation on a preset reference cancellation signal on the basis of the second information source to obtain a target cancellation signal; and performing self-interference cancellation processing on the second information source on the basis of the target cancellation signal to obtain a target information source. In the above manner, this embodiment achieves separate deployment of the remote radio unit and the baseband unit by deploying the digital domain self-interference cancellation apparatus at the fronthaul interface between the baseband unit and the remote radio unit; in a multi-device distributed network, the digital domain self-interference cancellation apparatus can form multiple interfaces through the convergence of multiple fronthaul interfaces, and realize connection with a plurality of baseband units and remote radio units through fronthaul interfaces, thereby realizing fast independent deployment. Not only is the deployment efficiency is improved, but also the requirements for hardware resources and computational resources and the deployment cost of the distributed network are reduced. Thus, the current technical problem of high cost of distributed deployment of a multi-device CCFD system is solved.

Figure 2:
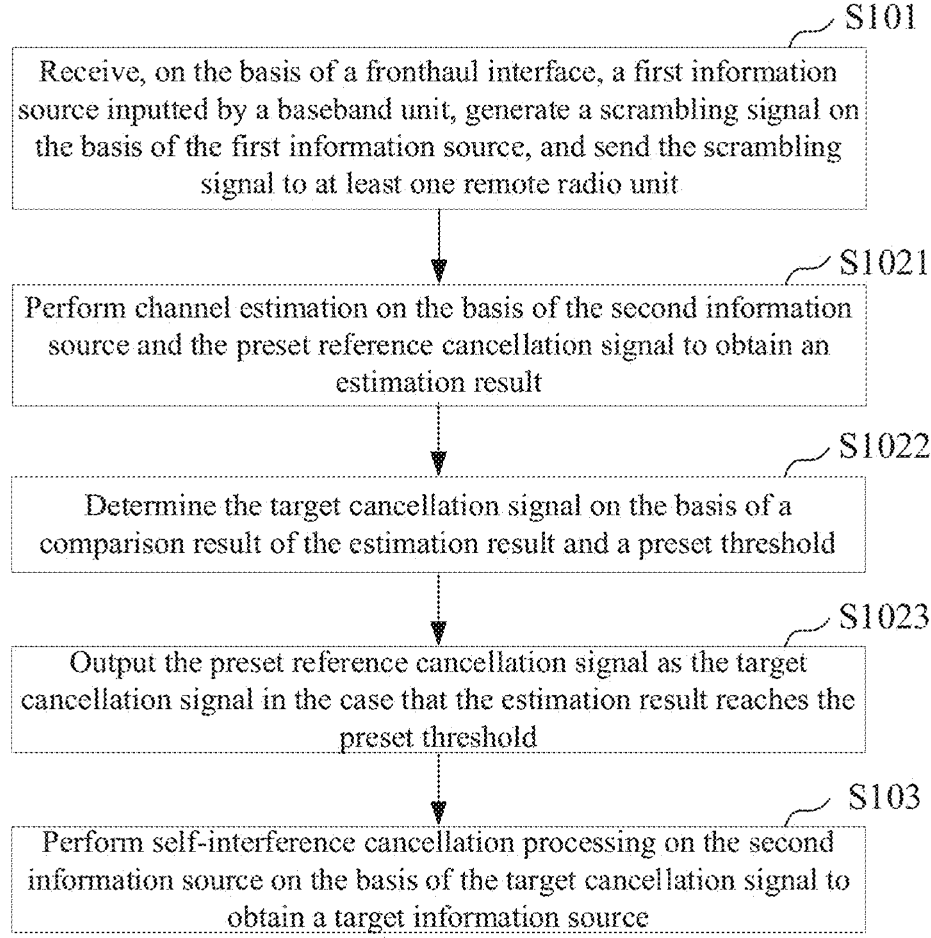
FIG. 2 is a flowchart of a second embodiment of a digital domain self-interference cancellation method according to the present disclosure.

Referring to FIG. 2, which is a flowchart of a second embodiment of a digital domain self-interference cancellation method according to the present disclosure;

in this embodiment, based on the embodiment shown in FIG. 1, the step S102 specifically includes the following.

At step S1021 channel estimation is performed on the basis of the second information source and the preset reference cancellation signal to obtain an estimation result.

At step S1022, the target cancellation signal is determined on the basis of a comparison result of the estimation result and a preset threshold.

At step S1023, the preset reference cancellation signal is output as the target cancellation signal in the case that the estimation result reaches the preset threshold.

In this embodiment, the self-interference scrambling module, while generating the scrambling signal, can generate a preset reference cancellation signal, as an input signal and an estimation basis of the self-interference channel estimation module, according to the characteristic values of the digital domain self-interference cancellation apparatus and the CCFD system; wherein the characteristic values may include reference data for multiple dimensions such as system latency, transmission path and hardware.

In an exemplary embodiment, upon receiving the second information source, the self-interference channel estimation module first performs channel estimation on the second information source and the preset reference cancellation signal, and then judges the estimation result based on the preset threshold. If the estimation result reaches the preset threshold, it is determined that the estimation result is passed, indicating that the preset reference cancellation signal can be used as the signal for canceling the scrambling sequence of the second information source, and self-interference signal cancellation processing can be performed on the second information source; at this time, the preset reference cancellation signal is inputted into the self-interference cancellation module as the target cancellation signal.

In an exemplary embodiment, based on the embodiment shown in FIG. 2, the step S1021 specifically includes:

- performing memory network model estimation on the basis of the second information source and the preset reference cancellation signal to obtain first estimation data;
- performing channel multipath propagation estimation on the basis of the second information source and the preset reference cancellation signal to obtain second estimation data; and
- determining self-interference suppression data and system resource data corresponding to the preset reference cancellation signal as the estimation result on the basis of the first estimation data and the second estimation data.

In this embodiment, the self-interference channel estimation module can perform channel estimation on the second information source (an uplink fronthaul signal with a self-interference scrambling sequence) and the calculation result of the adaptive algorithm module by taking the preset reference cancellation signal as a preset reference cancellation signal vector.

In an exemplary embodiment, the channel estimation includes, but is not limited to, second information source nonlinear interference signal extraction, memory network model estimation, channel multipath propagation estimation, and the like. The estimation result is judged from two dimensions: self-interference suppression and system resources.

Herein, the digital domain self-interference suppression is to estimate parameters such as multipath channel, and non-linear characteristics of the self-interference signal in the receiver digital domain by taking the digital self-interference signal as a reference source and suppress the self-interference signal; the system resources include but are not limited to schedule aging, system latency and resource usage, and the like.

In an exemplary embodiment, determining the target cancellation signal on the basis of the comparison result of the estimation result and the preset threshold further includes:

- determining the comparison result of the estimation result and the preset threshold on the basis of the preset threshold, the self-interference suppression data, and the system resource data;
- determining that the estimation result reaches the preset threshold, and taking the current adaptive cancellation signal as the target cancellation signal in the case that both the self-interference suppression data and the system resource data reach the preset threshold; and
- determining that the estimation result does not reach the preset threshold in the case that one or both of the self-interference suppression data and the system resource data do not reach the threshold.

In this embodiment, a threshold or a threshold range may be set for each of self-interference suppression and system resources.

In an exemplary embodiment, if the judgment results of both self-interference suppression and system resource dimensions reach the preset threshold or fall within the threshold range, it can be considered that the self-interference suppression data and the system resource data have reached an optimal equilibrium state. In this case, it can be considered that the current adaptive cancellation signal can effectively cancel the scrambling sequence of the second information source, and the canceled target information source can guarantee the integrity and authenticity of the information.

In an exemplary embodiment, if one or both of the judgment results of self-interference suppression and system resources do not reach the preset threshold or fall within the threshold range, it indicates that the current adaptive cancellation signal cannot effectively cancel the scrambling sequence of the second information source, which may lead to serious signal loss or heavy system load. In this case, it is necessary to optimize the current adaptive cancellation signal, and input the current adaptive cancellation signal into the adaptive algorithm module to continue the optimization until the optimal cancellation signal is obtained.

Figure 3:
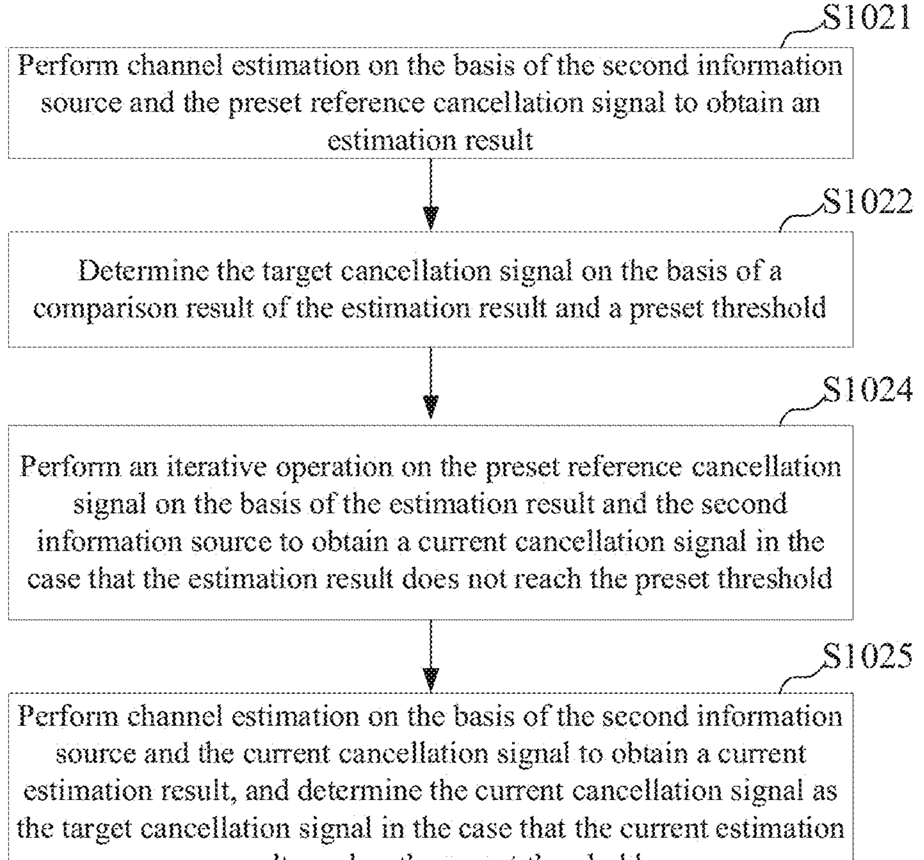
FIG. 3 is a flowchart of a third embodiment of a digital domain self-interference cancellation method according to the present disclosure.

Referring to FIG. 3, which is a flowchart of a third embodiment of a digital domain self-interference cancellation method according to the present disclosure;

in this embodiment, after the step S1022, based on the embodiment shown in FIG. 2, the method further includes the following.

At step S1024, an iterative operation is performed on the preset reference cancellation signal on the basis of the estimation result and the second information source to obtain a current cancellation signal in the case that the estimation result does not reach the preset threshold.

At step S1025, channel estimation is performed on the basis of the second information source and the current cancellation signal to obtain a current estimation result, and the current cancellation signal is determined as the target cancellation signal when the current estimation result reaches the preset threshold.

In an exemplary embodiment, if a channel estimation result of the self-interference channel estimation module for the preset reference cancellation signal and the second information source do not reach the preset threshold, it indicates that the preset reference cancellation signal cannot effectively cancel the scrambling sequence of the second information source. In this case, the preset reference cancellation signal cannot be used as the target cancellation signal. At this time, it is necessary for the adaptive algorithm module to perform the iterative operation on the basis of the preset reference cancellation signal according to the scrambling sequence of the second information source to obtain the current cancellation signal, then input the current cancellation signal into the self-interference channel estimation module for performing channel estimation on the current cancellation signal and the second information source to obtain the current estimation result corresponding to the current cancellation signal, and then compare the current estimation result with the preset threshold to judge whether the current cancellation signal can be used as the target cancellation signal.

In an exemplary embodiment, if the current estimation result reaches the preset threshold, then the current cancellation signal can be used as the target cancellation signal to cancel the scrambling sequence of the second information source; otherwise, on the basis of the current cancellation signal, the iterative operation is continued through the adaptive algorithm module unless the estimation result corresponding to the cancellation signal obtained by a certain iterative operation reaches the preset threshold, and the cancellation signal is inputted into the self-interference signal cancellation module as the target cancellation signal to complete the self-interference signal cancellation operation of the second information source.

In an exemplary embodiment, the adaptive algorithm module may include, but is not limited to, a deep learning model based on backpropagation algorithm, a BP neural network model based on feedforward, and a decision-making model based on a game theory.

The deep learning model based on backpropagation algorithm is configured to approach the target by a gradient descent method; the BP neural network model based on feedforward is configured to determine the weights of neurons of the neural network by training and verifying different sample signal sets, so as to approximate the real network status, and finally calculate the predicted self-interference cancellation result; and the decision-making model based on game theory is configured to perform equilibrium game calculation between the estimation result of self-interference suppression and system resources, to obtain the optimal output conclusion of the algorithm.

In this embodiment, the preset reference cancellation signal is generated based on the characteristic values of the system and the apparatus, and the characteristic values of the system and the apparatus are data obtained by parsing the scrambling signal, so it can be considered that the preset reference cancellation signal is generated on the basis of the scrambling signal, thereby making the preset reference cancellation signal more adapted to parse the scrambling signal; on this basis, through the channel estimation of the preset reference cancellation signal and the second information source generated based on the scrambling signal, the preset reference cancellation signal is corrected to obtain the target cancellation signal adapted to the scrambling sequence of the second information source. Therefore, not only can the self-interference cancellation effect on the scrambling signal be improved, but also the resolution rate on the interference signal can be accelerated, thereby improving the processing efficiency of the system for the self-interference signal.

Figures 4, 5:
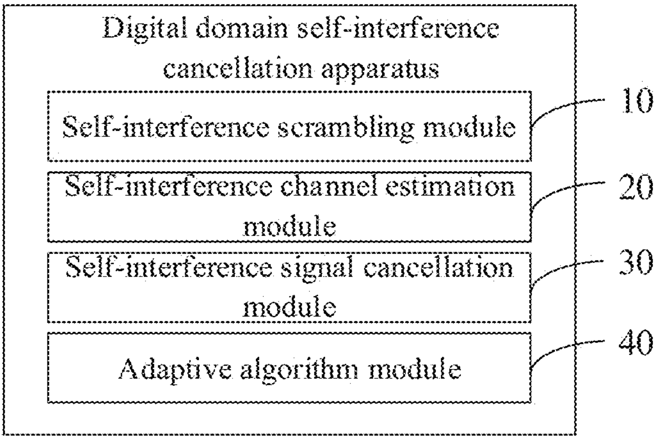
FIG. 4 is a schematic block diagram of a structure of a digital domain self-interference cancellation apparatus according to an embodiment of the present disclosure.
FIG. 5 is a schematic block diagram of a structure of a digital domain self-interference cancellation device according to an embodiment of the present disclosure.

Referring to FIG. 4, which is a schematic block diagram of a structure of a digital domain self-interference cancellation apparatus according to an embodiment of the present disclosure.

As shown in FIG. 4, the digital domain self-interference cancellation apparatus includes:

- a self-interference scrambling module 10, configured to receive a first information source inputted by a baseband unit on the basis of a fronthaul interface, generate a scrambling signal on the basis of the first information source, and send the scrambling signal to at least one remote radio unit;
- a self-interference channel estimation module 20, configured to receive a second information source sent by the remote radio unit on the basis of the scrambling signal, and perform an estimation operation on the second information source and a calculation result of an adaptive algorithm module;
- a self-interference signal cancellation module 30, configured to perform self-interference cancellation processing on the second information source on the basis of a target cancellation signal to obtain a target information source; and
- an adaptive algorithm module 40, configured to perform a correction operation on a preset reference cancellation signal on the basis of the second information source to obtain a target cancellation signal.

In an exemplary embodiment, the self-interference channel estimation module 20 specifically Includes:

- a channel estimation sub-module, configured to perform channel estimation based on the second information source and the preset reference cancellation signal to obtain an estimation result;
- an estimation result discriminating submodule, configured to determine the target cancellation signal on the basis of a comparison result of the estimation result and a preset threshold; and
- a target cancellation signal determination submodule, configured to output the preset reference cancellation signal as the target cancellation signal in the case that the estimation result reaches the preset threshold.

In an exemplary embodiment, the target cancellation signal determination sub-module further includes:

- a current cancellation signal obtaining unit, configured to perform an iterative operation on the preset reference cancellation signal on the basis of the estimation result and the second information source to obtain a current cancellation signal in the case that the estimation result does not reach the preset threshold; and
- a target cancellation signal determination unit, configured to perform channel estimation on the basis of the second information source and the current cancellation signal to obtain a current estimation result, and determine the current cancellation signal as the target cancellation signal when the current estimation result reaches the preset threshold.

In an exemplary embodiment, the channel estimation sub-module specifically includes:

- a first estimation data obtaining unit, configured to perform memory network model estimation on the basis of the second information source and the preset reference cancellation signal to obtain first estimation data;
- a second estimation data obtaining unit, configured to perform channel multipath propagation estimation on the basis of the second information source and the preset reference cancellation signal to obtain second estimation data; and an estimation result determination unit, configured to determine self-interference suppression data and system resource data corresponding to the preset reference cancellation signal as the estimation result on the basis of the first estimation data and the second estimation data.

In an exemplary embodiment, the estimation result discriminating sub-module further includes:

a comparison result determination unit, configured to determine the comparison result of the estimation result and the preset threshold on the basis of the preset threshold, the self-interference suppression data, and the system resource data;

a first estimation result determination unit, configured to determine that the estimation result reaches the preset threshold, and take the current adaptive cancellation signal as the target cancellation signal in the case that both the self-interference suppression data and the system resource data reach the preset threshold; and a second estimation result determination unit, configured to determine that the estimation result does not reach the preset threshold in the case that one or both of the self-interference suppression data and the system resource data do not reach the threshold.

In an exemplary embodiment, the self-interference scrambling module 10 specifically includes:

a scrambling reference signal generation unit, configured to generate a scrambling reference signal based on the service forms of the first information source; wherein the service forms include signal energy, signal quality, coding mode and service mode; and a scrambling signal generation unit, configured to perform scrambling processing on the first information source on the basis of the scrambling reference signal to generate the scrambling signal.

In an exemplary embodiment, the self-interference channel estimation module 20 specifically includes:

a second information source acquisition unit, configured to spatially propagate the scrambling signal by the remote radio unit, and acquire a near-end reception signal of the remote radio unit as the second information source; and a second information source receiving unit, configured to receive the second information source sent by each remote radio unit on the basis of at least one fronthaul interface.

Referring to FIG. 5, which is a schematic block diagram of a structure of a digital domain self-interference cancellation device according to an embodiment of the present disclosure.

As shown in FIG. 5, the digital domain self-interference cancellation device 300 includes a processor 301 and a memory 302, wherein the processor 301 and the memory 302 are connected by a bus 303, such as an inter-integrated circuit (I2C) bus.

Specifically, the processor 301 is configured to provide computing and control capabilities that support the operation of the entire digital domain self-interference cancellation device. The processor 301 may be a central processing unit (CPU), other general-purpose processors, digital signal processors (DSPs), application specific integrated circuits (ASICs), field-programmable gate arrays (FPGAs) or other programmable logic devices, discrete gates or transistor logic devices, discrete hardware components, etc. The general-purpose processor may be a microprocessor or any conventional processor or the like.

Specifically, the memory 302 may be a Flash chip, a read-only memory (ROM) disk, an optical disk, a USB flash disk, or a removable hard disk, etc.

Those skilled in the art can appreciate that the structure shown in FIG. 5 is only a block diagram of a part of the structure related to the solution of the embodiments of the present disclosure, without constituting a limitation on the digital domain self-interference cancellation device to which the solution of the embodiments of the present disclosure are applied. A specific digital domain self-interference cancellation device may include more or fewer components than shown in the figures, or combine some components, or have a different arrangement of components.

The processor 301 is configured to run the computer program stored in the memory 302, and implement any one of the digital domain self-interference cancellation methods provided by the embodiments of the present disclosure when executing the computer program.

In an embodiment, the processor 301 is configured to run a computer program stored in the memory and, when executing the computer program, implement the following steps:

In an embodiment, the processor 301, during implementing, is configured to implement:

receiving a first information source inputted by a baseband unit on the basis of a fronthaul interface, generating a scrambling signal on the basis of the first information source, and sending the scrambling signal to at least one remote radio unit;

receiving a second information source sent by the remote radio unit on the basis of the scrambling signal, and performing a correction operation on a preset reference cancellation signal on the basis of the second information source to obtain a target cancellation signal; and performing self-interference cancellation processing on the second information source on the basis of the target cancellation signal to obtain a target information source.

It should be noted that those skilled in the art can clearly understand that for the convenience and conciseness of description, the specific working process of the digital domain self-interference cancellation device described above can refer to the corresponding process in the aforementioned digital domain self-interference cancellation method embodiment, and will not be repeated here.

Embodiments of the present disclosure also provide a storage medium for computer-readable storage, the storage medium storing one or more programs executable by one or more processors to implement any one of the digital domain self-interference cancellation methods as provided by embodiments of the present disclosure.

The storage medium may be an internal storage unit of the digital domain self-interference cancellation device of the previous embodiments, such as a hard disk or a memory of the digital domain self-interference cancellation device. The storage medium may also be an external storage device of the digital domain self-interference cancellation device, such as a plug-in hard disk, a smart media card (SMC), a secure digital (SD) card, and a flash card provided on the digital domain self-interference cancellation device.

Those skilled in the art can understand that all or some of the steps, systems and functional modules/units in the methods disclosed above can be implemented as software, firmware, hardware and their appropriate combinations. In the hardware embodiment, the division between functional modules/units mentioned in the above description does not necessarily correspond to the division of physical components; for example, a physical component can have multiple functions, or a function or step can be executed by several physical components in cooperation. Some or all of the physical components may be implemented as software executed by a processor, such as a central processing unit, a digital signal processor or a microprocessor, or as hardware, or as an integrated circuit, such as an application specific integrated circuit. Such software may be distributed on computer-readable media, which may include computer storage media (or non-transitory media) and communication media (or transitory media). As is well known to those skilled in the art, the term computer storage media includes volatile and nonvolatile, removable and non-removable media implemented in any method or technology for storing information, such as computer-readable instructions, data structures, program modules or other data. Computer storage media include, but are not limited to, RAM, ROM, EEPROM, flash memory or other memory technologies, CD-ROM, digital versatile disk (DVD) or other optical disk storage, magnetic boxes, magnetic tapes, magnetic disk storage or other magnetic storage devices, or any other media that can be used to store desired information and can be accessed by a computer. Furthermore, it is well known to those skilled in the art that communication media usually contain computer-readable instructions, data structures, program modules or other data in a modulated data signal such as a carrier wave or other transmission mechanism, and may include any information delivery media.

It should be understood that the term "and/or" used in the description and the appended claims of the present disclosure refers to any combination of one or more of the associated listed items and all possible combinations, and includes these combinations. It should be noted that in this paper, the terms "including", "containing" or any other variation thereof are intended to cover non-exclusive inclusion, so that a process, method, article or system including a series of elements includes not only those elements, but also other elements not explicitly listed, or elements inherent to such process, method, article or system. Without more restrictions, an element defined by the phrase "including a" does not exclude the existence of other identical elements in the process, method, article or system that includes the element.

The above serial numbers of the embodiments of the present disclosure are merely for description, and do not represent the superiority or inferiority of the embodiments. The above is only specific embodiments of the present disclosure, but the protection scope of the present disclosure is not limited thereto, and any person skilled in the art can easily conceive various equivalent modifications or substitutions within the technical scope disclosed in the present disclosure, and these modifications or substitutions shall be all included in the protection scope of the present disclosure. Therefore, the protection scope of the present disclosure should be subject to the protection scope of the claims.

What is claimed:

1. A digital domain self-interference cancellation method, comprising:

receiving, on a basis of a fronthaul interface, a first information source inputted by a baseband unit, generating, on the basis of the first information source, a scrambling signal, and sending the scrambling signal to at least one remote radio unit;

receiving a second information source sent by the at least one remote radio unit on the basis of the scrambling signal, and performing, on the basis of the second information source, a correction operation on a preset reference cancellation signal to obtain a target cancellation signal; and performing, on the basis of the target cancellation signal, self-interference cancellation processing on the second information source to obtain a target information source.

2. The digital domain self-interference cancellation method according to claim 1, wherein performing, on the basis of the second information source, the correction operation on the preset reference cancellation signal to obtain the target cancellation signal, comprises:

performing, on the basis of the second information source and the preset reference cancellation signal, channel estimation to obtain an estimation result;

determining, on a basis of a comparison result of the estimation result and a preset threshold, the target cancellation signal; and outputting, in the case that the estimation result reaches the preset threshold, the preset reference cancellation signal as the target cancellation signal.

3. The digital domain self-interference cancellation method according to claim 2, wherein after determining, on the basis of the comparison result of the estimation result and the preset threshold, the target cancellation signal, the method further comprises:

performing, in the case that the estimation result does not reach the preset threshold, an iterative operation on the preset reference cancellation signal on the basis of the estimation result and the second information source to obtain a current cancellation signal; and performing, on the basis of the second information source and the current cancellation signal, channel estimation to obtain a current estimation result, and determining, in the case that the current estimation result reaches the preset threshold, the current cancellation signal as the target cancellation signal.

4. The digital domain self-interference cancellation method according to claim 2, wherein performing, on the basis of the second information source and the preset reference cancellation signal, channel estimation, to obtain the estimation result, comprises:

performing, on the basis of the second information source and the preset reference cancellation signal, memory network model estimation to obtain first estimation data;

performing, on the basis of the second information source and the preset reference cancellation signal, channel multipath propagation estimation to obtain second estimation data; and determining, on the basis of the first estimation data and the second estimation data, self-interference suppression data and system resource data corresponding to the preset reference cancellation signal as the estimation result.

5. The digital domain self-interference cancellation method according to claim 4, wherein determining, on the basis of the comparison result of the estimation result and the preset threshold, the target cancellation signal, further comprises:

determining, on the basis of the preset threshold, the self-interference suppression data and a system resource data, the comparison result of the estimation result and the preset threshold;

determining, in the case that both the self-interference suppression data and the system resource data reach the preset threshold, that the estimation result reaches the preset threshold, and taking a current adaptive cancellation signal as the target cancellation signal; and determining, in the case that one or both of the self-interference suppression data and the system resource data do not reach the threshold, that the estimation result does not reach the preset threshold.

6. The digital domain self-interference cancellation method according to claim 1, wherein generating, on the basis of the first information source, the scrambling signal, comprises:

generating, on a basis a service form of the first information source, a scrambling reference signal; wherein the service form comprises signal energy, signal quality, a coding mode and a service mode; and performing, on the basis of the scrambling reference signal, scrambling processing on the first information source to generate the scrambling signal.

7. The digital domain self-interference cancellation method according to claim 1, wherein receiving the second information source sent by the at least one remote radio unit on the basis of the scrambling signal, comprises:

propagating, on the basis of the at least one remote radio unit, the scrambling signal spatially, and acquiring a near-end reception signal of the at least one remote radio unit as the second information source; and receiving, on the basis of the fronthaul interface, the second information source sent by the at least one remote radio unit.

8. A digital domain self-interference cancellation device, comprising a processor, a non-transitory memory, a computer program stored on the non-transitory memory and executable by the processor, and a data bus configured to realize connection communication between the processor and the non-transitory memory, wherein the computer program, when executed by the processor, implements the steps of the digital domain self-interference cancellation method according to claim 1.

9. A non-transitory storage medium, for computer-readable storage, the non-transitory storage medium storing one or more programs executable by one or more processors to implement the steps of the digital domain self-interference cancellation method according to claim 1.

10. The digital domain self-interference cancellation method according to claim 2, wherein receiving the second information source sent by the at least one remote radio unit on the basis of the scrambling signal, comprises:

propagating, on the basis of the at least one remote radio unit, the scrambling signal spatially, and acquiring a near-end reception signal of the at least one remote radio unit as the second information source; and receiving, on the basis of the fronthaul interface, the second information source sent by the at least one remote radio unit.

11. The digital domain self-interference cancellation method according to claim 3, wherein receiving the second information source sent by the at least one remote radio unit on the basis of the scrambling signal, comprises:

propagating, on the basis of the at least one remote radio unit, the scrambling signal spatially, and acquiring a near-end reception signal of the at least one remote radio unit as the second information source; and receiving, on the basis of the fronthaul interface, the second information source sent by the at least one remote radio unit.

12. The digital domain self-interference cancellation method according to claim 4, wherein receiving the second information source sent by the at least one remote radio unit on the basis of the scrambling signal, comprises:

propagating, on the basis of the at least one remote radio unit, the scrambling signal spatially, and acquiring a near-end reception signal of the at least one remote radio unit as the second information source; and receiving, on the basis of the fronthaul interface, the second information source sent by the at least one remote radio unit.

13. The digital domain self-interference cancellation method according to claim 5, wherein receiving the second information source sent by the at least one remote radio unit on the basis of the scrambling signal, comprises:

propagating, on the basis of the at least one remote radio unit, the scrambling signal spatially, and acquiring a near-end reception signal of the at least one remote radio unit as the second information source; and receiving, on the basis of the fronthaul interface, the second information source sent by the at least one remote radio unit.

14. The digital domain self-interference cancellation method according to claim 6, wherein receiving the second information source sent by the at least one remote radio unit on the basis of the scrambling signal, comprises:

propagating, on the basis of the at least one remote radio unit, the scrambling signal spatially, and acquiring a near-end reception signal of the at least one remote radio unit as the second information source; and receiving, on the basis of the fronthaul interface, the second information source sent by the at least one remote radio unit.

* * * * *